May 7, 1968   J. D. VAN BENTHUYSEN ET AL   3,382,473
DETACHABLE SHAFT FOR ELECTRICAL CONTROL
Filed May 31, 1966

INVENTOR
JOHN D. VAN BENTHUYSEN
ARTHUR L. ROZEMA
BY John J. Gaydos
ATTORNEY

United States Patent Office 3,382,473
Patented May 7, 1968

3,382,473
DETACHABLE SHAFT FOR ELECTRICAL
CONTROL
John D. Van Benthuysen and Arthur L. Rozema, Elkhart, Ind., assignors to CTS Corporation, Elkhart, Ind., a corporation of Indiana
Filed May 31, 1966, Ser. No. 554,111
13 Claims. (Cl. 338—166)

ABSTRACT OF THE DISCLOSURE

An electrical control having a detachable shaft attachable and detachable from such control by passing one end of the shaft into an opening provided in a driver positioned within the control, the driver being supported therein by a rearwardly extending bearing integral therewith. An opening in the driver is configured to produce an interference fit with the shaft during insertion of the shaft into the opening and a hub having an opening therein is formed integrally with the driver. Abutments positioned in the opening of the driver are movable in response to insertion of the shaft and as a pair of shoulders on the shaft pass beyond the abutments, the abutments move against the shaft to secure the shaft in a predetermined position relative to the driver. An end play compensator may be supported on the driver in engagement with the end of the shaft to eliminate shaft end play. In addition, the shaft may be provided with an integral manually operable knob.

---

Figure 1:
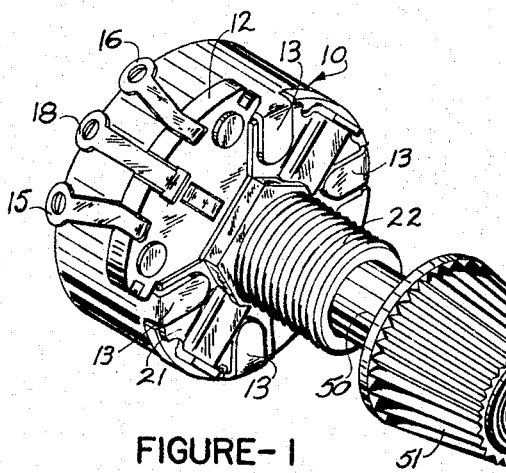

The present invention relates to electrical controls and, more particularly, to an electrical control such as a variable resistor or an electric switch operable with a detachable shaft.

Detachable shafts have been employed with electrical controls for many years. Generally a detachable shaft is provided with a longitudinally extending bifurcated end portion having a pair of laterally extending abutments engageable with the lateral sides of the driver of a control. Conversely, the driver or carrier can be provided with a pair of integral jaws arranged to part as the beveled end of a shaft or spindle passes between the jaws and close to locate the spindle between shoulders provided on the jaws. Such devices and other advanced types of detachable shafts available on the market are exemplified by those disclosed and claimed in U.S. Patent No. 2,669,634 assigned to the same assignee as the present invention. At the outset, electrical controls with detachable shafts were employed to decrease inventory of controls having various length and type shafts since the manufacturers of electrical apparatus frequently altered the mounting locations of the controls with respect to a front locating panel. Once the proper length shaft for the control was determined, the shaft was inserted into the control without any need for removing the shaft therefrom even if the electrical apparatus was serviced and the control was replaced. Although either of the above-referred detachable shaft designs accomplish the desired result of securing the shaft to the driver, difficulties of detaching the shaft from the driver, controlling pull-out force and eliminating end play continue to exist when such controls are employed in current electrical apparatus. Uniformity of pull-out force for detachable shafts is preferable to prevent inadvertent removal of a shaft upon rotation thereof during normal operation or use of the control and to permit removal of the shaft when desired, e.g., during repair, without manually compressing the bifurcated end portion of the shaft or spreading the jaws integral with the driver to free the shaft as is necessary with currently available designs. It would, therefore, be desirable to provide a detachable shaft for an electrical control wherein the shaft can be detached from the driver with a uniform pull-out force and end play of the shaft with respect to the driver is eliminated.

Manufacturing cost of electrical apparatus is reduced if the time involved to assemble the apparatus or the cost of the individual components employed therein is reduced. In present apparatus, a knob is secured to the shaft of a control with a set screw or a biasing spring. A means for reducing assembling time as well as the cost of the electrical apparatus is to mold the knob with the shaft of the control as an integral part. When the knob is integral with the shaft, it is essential that the shaft be secured to the control after the conrol is mounted in the apparatus but yet be detachable from the control in a simple and facile manner when the electrical apparatus is serviced to replace the control. It would, therefore, be desirable to make an improved detachable shaft for a control having a knob integral with the shaft.

The driver or carrier of a variable resistance control is usually provided with a radial or thrust bearing rotatably supporting the driver. When a shaft is detachably secured to the driver, a thrust bearing comprising an annular ring extending rearwardly of the driver abuts against the rear wall of the control and circumposes an inwardly extending circular flange centering the driver in the housing. In certain electrical apparatus, an electrical control having a radial bearing for supporting the driver is preferred but radial bearings generally have been limited to drivers having fixed or integral shafts since the currently available means of securing the driver to the shaft extends axially beyond the driver. It would, therefore, also be desirable to provide a driver of an electric control with a radial bearing and operable with a detachable shaft.

Accordingly, it is an object of the present invention to provide a new and improved electrical control with a detachable shaft. Another object of the present invention is to provide an electrical control with a detachable shaft having a predetermined pull-out force. An additional object of the present invention is to provide an electrical control with a detachable shaft having an end play compensator. A further object of the present invention is to provide a driver of an electrical control with a slot containing a pair of opposed abutments or shoulders integral with the driver and extending inwardly into the slot and wherein a detachable shaft, when inserted into the slot of the driver, engages the abutments to secure the shaft to the driver. Still another object of the present invention is to provide an electrical control with a driver having a bridging member carrying a compensator for eliminating longitudinal movement of a detachable shaft with respect to the driver after the shaft is detachably secured thereto. Still an additional object of the present invention is to provide an electrical control with a driver having a hub means provided with a non-circular slot receiving a detachable shaft means, and a pair of opposed shoulders integral with one of the means extend into notches provided in the other means as the shaft is inserted into the slot. Yet another object of the present invention is to provide a detachable shaft for an electrical control having a manually operable knob integral with the shaft. Further objects and advantages of the present invention will become apparent as the following description proceeds, and the features of novelty characterizing the invention will be pointed out with particularity in the claims annexed to and forming a part of this specification.

Briefly, the present invention is concerned with an electrical control such as a variable resistance control having a driver or an electrical switch having a switch actuator operable with a detachable shaft. Preferably the control is assembled without the shaft and delivered to an installer for mounting to a panel. After the control is mounted to the panel, the detachable shaft is inserted into the control by passing one end of the shaft into an opening provided in the driver. The driver is supported in the control by means of a rearwardly extending bearing integral with the driver and supported by the rear wall of the housing of the control. In one form of the invention, the relationship between the opening in the driver and the end of the shaft is such that an interference fit is obtained as the shaft is inserted into the opening. Preferably, the driver is provided with a hub also having a slot, and a pair of opposed abutments extend inwardly into the slot. As the shaft is passed into the hub, the chamfered or beveled end of the shaft presses the opposed abutments outwardly until a pair of shoulders of the shaft pass beyond the edge of the abutments locating and securing the shaft to the driver. In another embodiment the driver is provided with a bridging member supporting a compensator engageable with the end of the shaft for eliminating longitudinal motion of the shaft with respect to the driver. In another form of the invention, the other end of the shaft is provided with an integral manually operable knob requiring that the shaft be detachable in a simple and facile manner without use of unreasonable pull-out force when the electrical apparatus is serviced.

Figure 2:
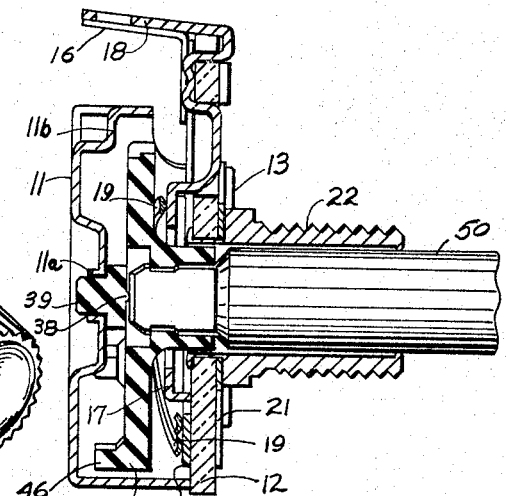
Figure 4:
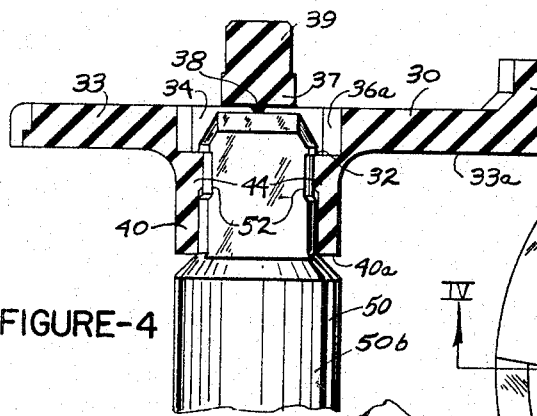
Figure 3:
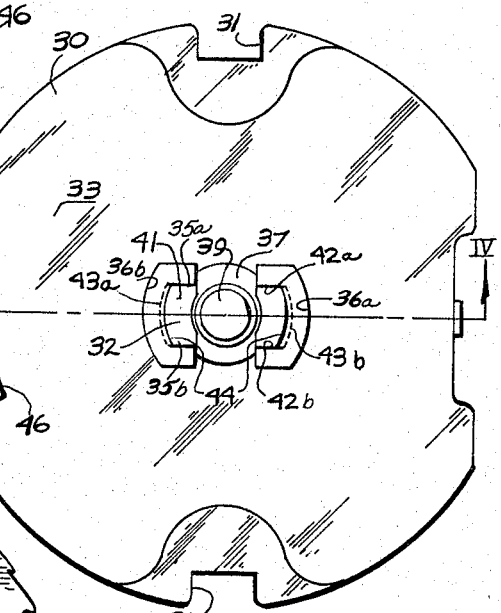
Figure 5:
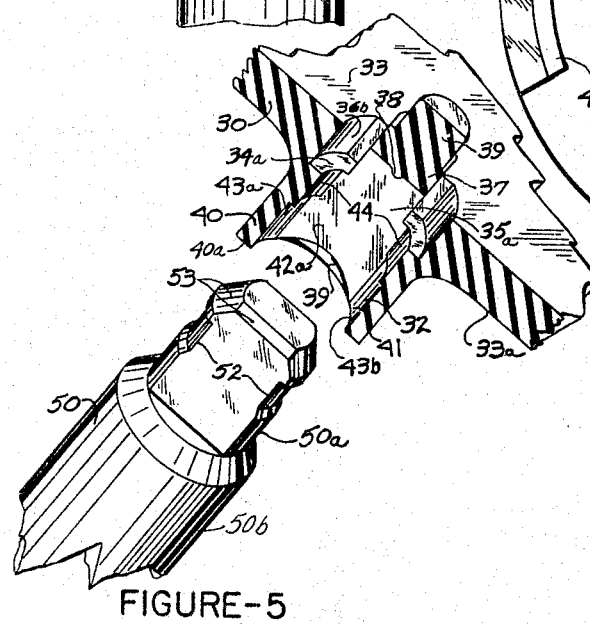

For a better understanding of the present invention, reference may be had to the accompanying drawings wherein the same reference numerals have been applied to like parts and wherein: FIGURE 1 is an isometric view of an improved electrical control built in accord with the present invention; FIGURE 2 is a sectional view of the control shown in FIGURE 1; FIGURE 3 is an enlarged top plan view of the driver shown in FIGURE 2 of the drawings; FIGURE 4 is a sectional view of the driver taken along lines IV—IV of FIGURE 3; and FIGURE 5 is a fragmentary isometric view of the driver and detachable shaft shown in FIGURE 4 with a section of the driver removed to show the inner configuration of the slot provided therein.

Referring now to FIGURES 1 and 2 of the drawings, there is illustrated an electrical control, e.g., a variable resistance control, generally indicated at 10, of the type employed in electrical apparatus such as radio and television sets.

The variable resistance control 10 comprises a hollow cylindrical cover or housing 11 having an open end, and a base 12 of suitable electrically nonconductive material closing the open end of the cover 11 is fixedly secured thereto with a plurality of ears 13 folded over the outer surface of the base 12. Means 14 defining an arcuate resistance path, e.g., a carbon film resistance element, is suitably attached to the base, and the ends of the resistance path are connected to a pair of terminals 15 and 16 suitably secured to the base 12. Instead of the carbon film resistance element, an arcuate wirewound resistance element also can be disposed in the cover in a suitable manner. A center collector 17 (see FIGURE 2) in fixed concentric relationship with respect to the resistance element is provided with a center terminal 18, and a contactor 19 in wipable engagement with the collector and the resistance element electrically connects the resistance element to the center collector 17. To wipe the contactor intermediate the ends of the resistance element, a driver 30 is rotatably mounted in the cover 11, and the contactor 19, provided with a pair of folded tabs disposed in notches 31 formed in the driver 30, constrains the contactor to rotate with the driver.

For the purpose of mounting the electrical control 10 to a not-shown mounting panel, the electrical control is provided with a ground plate 21 fixedly secured to the base by the ears 13. A threaded bushing 22 suitably secured to the ground plate 21 extends forwardly therefrom into an opening in the panel and a nut threadedly engaging the bushing 22 secures the electrical control 10 to the mounting panel. Preferably, controls of the present type are secured to mounting panels, and thereafter one end 50a of a shaft 50 is inserted into the bushing 22 with the end of the shaft passing into an opening 32 provided in the driver 30 detachably securing the driver to the shaft. In one form of the invention, as illustrated in FIGURE 1 of the drawings, the shaft 40 is molded with an integral knob 51. With such arrangement, it is essential that the shaft be detachable from the control in a simple and facile manner, otherwise difficulties will be encountered in servicing the electrical apparatus containing the control 10. The driver 30 comprises a disc 33 of suitable resilient dielectric material, such as nylon, and a cylindrical hub 40 integral with the central portion of the disc is provided with a centrally disposed noncircular slot 41 forming part of the opening 32. The noncircular slot 41 need not extend to the shaft inserting end or front face 40a of the hub but can communicate with a circular opening provided in the shaft inserting end 40a receiving the circular portion 50a of the shaft for increasing the engaging area between the hub 40 and the shaft 50. The slot 41 can be of various noncircular configurations, as shown in the drawings, the slot 41 is defined by a pair of spaced parallel side walls 42a and 42b and a pair of spaced arcuate end walls 43a and 43b forming a substantially rectangular slot. According to the present invention two of the walls of the slot, preferably the end walls, are provided with a pair of opposed inwardly extending shoulders 44. In order that the shoulders 44 can be easily forced radially outwardly upon insertion of the shaft 50 into the slot 41, the shoulders 44 as best shown in FIGURE 4 of the drawings, are adjacent to and below a plane defining the face 33a of the disc 33 joining the outer periphery of the hub. The end portion 50a of the shaft 50 has a cross section corresponding to the slot 41 and the remainder of the shaft generally is a continuation of the circular portion 50b. A pair of opposed notches 52 are provided in the end portion 50a of the shaft corresponding to the shoulders 44 extending inwardly of the slot 41 to maintain the shaft 50 secured to the driver 30 after the shaft is inserted into the slot 41. The notches 52 can extend longitudinally to the circular portion 50b.

In a preferred form of the invention, the disc 33 is also provided with a through slot 34 communicating with the slot 41 provided in the hub. The slot 34 is defined by side walls 35a and 35b and by arcuate end walls 36a and 36b. Preferably the slots 34 and 41 are of similar configuration to permit insertion of the end portion 50d of the shaft through the slot 41 and into the slot 34. Both of the slots together define opening 32. As best shown in FIGURE 5 of the drawings, the side walls 35a and 35b of the slot 34 are extensions of the side walls 42a and 42b to obtain maximum interengagement between the driver and the shaft constraining the driver to rotate with the shaft.

According to the present invention, a bridging member 37 extends across the slot 34, and an end play compensator 38 integral with the bridging member faces the slot 34 for eliminating longitudinal movement of the shaft with respect to the driver. The end of the shaft contacts the compensator 38 before the shoulders 44 are in alignment with the notches 52 provided in the shaft 50. As the shaft is inserted further into the slot, the compensator is compressed and forced inwardly into the bridging member and, after the shoulders 44 are in alignment with the notches 52 detachable securing the shaft to the driver, the compensator biases the shaft in the other direction. It is, therefore, necessary that the compensator be of a resilient material such as nylon.

From the above description, it will be apparent that means must be provided for supporting the driver 30 centrally in the housing in order that the shaft when inserted through the bushing 22 is in alignment with the center of the driver. To this end, a radial bearing 39 extending rearwardly from the bridging member 37 and axially of the shaft is journaled in an aperture 11a provided in the rear wall of the cover 11. Moreover, to facilitate insertion of the shaft into the opening 32, the neck of the hub 40 and the end of the shaft 50 are chamfered as respectively indicated at 53 and 39 in FIGURE 5 of the drawings.

In a device built in accord with the present invention, the cross sectional dimensions of the slot 41 and the end portion 50a of the shaft are the same, and the shoulders 44 extend inwardly into the slot 41 about .005 inch while the notches 52 in the shaft are recessed .005 inch. Obviously the end of the shaft could be provided with a pair of not shown opposed shoulders or protuberances extending radially to a dimension beyond the corresponding dimension of the opening 32 and abuttable against the bottom ledge 34a of the slot 34. As shown in the drawings, the distance between end walls 36a and 36b of slot 34 is larger than the distance between end walls 43a and 43b to provide ample clearance for the shoulders on the end of the shaft. When a metal shaft, e.g., of steel or brass, is employed, it is merely necessary to provide suitable radially extending shoulders on the shaft. Upon insertion of the metal shaft into a slot or opening having flush side walls of a resilient material, the radially extending shoulders on the shaft engage the side walls of the slot forcing the sidewalls outwardly until the shaft is fully inserted into the slot. The side walls eventually take at least a partial set forming notches around the shoulders of the shaft maintaining the shaft firmly secured to the driver. In any event it is critical that the shoulders 44 or notches in the opening of the driver lie within the rear face 33a and the front face 40a thereof.

For limiting rotation of the driver, the driver is provided with a longitudinally extending stop arm 46 engageable with a stop member 11b formed in the cover as shown in FIGURE 2 of the drawings. When a not-shown switch is mounted in tandem with the variable resistance control 10, the driver is also provided with a not-shown switch actuating member.

From the above description it will be apparent that an inexpensive means has been provided for detachably securing a shaft to a variable resistance control in a simple and facile manner.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

What is claimed as new and desired to be secured by Letters Patent of the United States is:

1. In a variable resistance control for use with a shaft readily detachable therefrom, the combination of a base, a variable resistance element secured to the base, a rotatable driver of resilient dielectric material having a front face and a rear face, a contractor constrained to rotate with the driver for wiping contact with the resistance element, the driver being provided with a slot communicating with at least one of the faces, and a pair of shoulders disposed in the slot between the front and rear faces of the driver, the shoulders extending radially inwardly to reduce the size of the slot adjacent the shoulders thereby to provide resistance to axial movement of a shaft in the slot, such resistance being sufficient to prevent substantial axial movement of a shaft relative thereto during normal operating conditions.

2. The variable resistance control of claim 1, wherein a shaft is disposed in the slot, and a knob is molded to one end of the shaft.

3. The variable resistance control of claim 1, wherein a housing encloses the driver, and a bearing carried by the driver is rotatably supported by the housing.

4. In a variable resistance control, the combination of a base, a variable resistance element secured to the base, a rotatable driver of resilient dielectric material having a front face and a rear face, a contactor constrained to rotate with the driver for wiping contact with the resistance element, the driver being provided with a slot communicating with one of the faces, a shaft having one end disposed in the slot, a knob molded with the shaft for rotating the driver and wiping the contact means against the resistance element, and means responsive to movement of the shaft to a predetermined position in the slot for detachably securing the shaft in said predetermined position, said last mentioned means resisting axial movement of the shaft relative to the slot during normal operation.

5. The control of claim 4, wherein the means for detachably securing the shaft is disposed between the front and rear faces of the driver.

6. A driver for a variable resistance control comprising a disc member of dielectric material, a hub integral with the disc member and extending axially from the disc member from one face thereof, the hub being provided with an axially extending noncircular first slot, a pair of shoulders carried by the hub and extending radially inwardly of the slot whereby upon insertion of a shaft member forwardly into the slot with a certain amount of force the shoulders move radially and detachably secure the shaft member to the hub in a predetermined fixed position relative to the hub and upon exerting the same amount of force to the shaft member in the opposite direction the shaft member is detached from the hub.

7. The driver of claim 6, wherein the disc member is provided with a centrally disposed second slot communicating with the first slot provided in the hub and the end of the shaft member is insertable into the first and second slots.

8. The driver of claim 6, wherein an end play compensator carried by one of the members extends axially into the slot and is engageable with the other of the members for biasing the shaft member outwardly of the slot to eliminate longitudinal motion between the members.

9. The driver of claim 7, wherein a bridging member extends across the second slot and an end play compensator integral with the bridging member faces the second slot for biasing the shaft member rearwardly.

10. The driver of claim 6, wherein an axially extending bearing integral with the disc member rotatably supports the driver in a housing.

11. The driver of claim 6, wherein the slot is defined by a pair of spaced parallel side walls and a pair of arcuate end walls, the neck of the slot is chamfered to facilitate insertion of the shaft member into the slot and the shoulders are disposed in the slot adjacent to a plane defining the face of the disc member contiguous with the hub.

12. A driver and shaft means for a variable resistance control comprising a disc of dielectric material, hub means integral with the disc, the hub means being provided with an axially extending noncircular slot adapted to receive the shaft means, at least one shoulder integral with one of said means, and the other of said means being provided with at least one notch corresponding to the shoulder, the notch and shoulder interfitting for detachably securing the shaft to the hub and maintaining the shaft in a substantially fixed predetermined axial position relative to the hub.

13. The driver of claim 12, wherein an end-play compensator is integral with the disc and extends into the slot for biasing the shaft outwardly.

References Cited
UNITED STATES PATENTS

| | | |
|---|---|---|
| 3,012,213 | 12/1961 | Vaksvik 338—134 |
| 3,185,783 | 5/1965 | Dowdle et al. 200—42 X |
| 2,257,979 | 10/1941 | Rubinstein. |
| 2,669,634 | 2/1954 | Daily et al. |
| 2,745,927 | 5/1956 | Daily et al. |
| 2,897,717 | 6/1961 | O'Shea et al. |
| 3,090,024 | 5/1963 | Melvin. |

FOREIGN PATENTS 899,204  3/1945  France.

OTHER REFERENCES

British Patent No. 859,001, filed Oct. 9, 1959, published 1-18-61.

ROBERT K. SCHAEFER, *Primary Examiner.*

H. J. HOHAUSER, *Assistant Examiner.*